United States Patent
Chiu et al.

(10) Patent No.: US 11,835,750 B1
(45) Date of Patent: Dec. 5, 2023

(54) BACKLIGHT MODULE AND DISPLAY DEVICE THEREOF

(71) Applicant: DARWIN PRECISIONS CORPORATION, Hsinchu County (TW)

(72) Inventors: Yu-Huan Chiu, Hsinchu County (TW); Hsiang-I Hu, Hsinchu County (TW); Yu-Shan Shen, Hsinchu County (TW)

(73) Assignee: DARWIN PRECISIONS CORPORATION, Hsinchu County (TW)

( * ) Notice: Subject to any disclaimer, the term of this patent is extended or adjusted under 35 U.S.C. 154(b) by 0 days.

(21) Appl. No.: 18/120,430

(22) Filed: Mar. 13, 2023

(30) Foreign Application Priority Data

Nov. 30, 2022 (TW) .................................. 111145961

(51) Int. Cl.
*F21V 8/00* (2006.01)

(52) U.S. Cl.
CPC ......... *G02B 6/0043* (2013.01); *G02B 6/0068* (2013.01); *G02B 6/0076* (2013.01)

(58) Field of Classification Search
CPC ... G02B 6/0043; G02B 6/0068; G02B 6/0076
See application file for complete search history.

(56) References Cited

U.S. PATENT DOCUMENTS

| | | | | |
|---|---|---|---|---|
| 10,459,260 B2 * | 10/2019 | Wu | ...................... | G02B 6/0038 |
| 11,150,399 B2 * | 10/2021 | Liao | ...................... | G02B 6/0051 |
| 11,402,675 B1 * | 8/2022 | Chen | ...................... | G02F 1/1334 |
| 2021/0191027 A1 * | 6/2021 | Liao | ...................... | G02B 6/0053 |
| 2021/0239896 A1 * | 8/2021 | Tang | ...................... | G02B 6/005 |

FOREIGN PATENT DOCUMENTS

| | | |
|---|---|---|
| TW | I541570 B | 7/2016 |
| TW | M628809 U | 6/2022 |

* cited by examiner

*Primary Examiner* — Mary Ellen Bowman (57) ABSTRACT

A backlight module includes a first and a second light guide plate; a turning film; a first, a second, and a third light source module. The first light guide plate has a first light entrance surface, a first light-emitting surface, a first bottom surface, and a light guide structure formed on the first bottom surface. The second light guide plate is disposed above the first light-emitting surface and has a second light-emitting surface, a second bottom surface, a second light entrance surface, a third light entrance surface, and optical microstructures, wherein the second and the third light entrance surface are located on two opposite sides of the second light guide plate. The turning film is disposed between the two light guide plates. The first, the second, and the third light source module are disposed aside the first, the second, and the third light entrance surface, respectively.

9 Claims, 7 Drawing Sheets

FIG. 11

BACKLIGHT MODULE AND DISPLAY DEVICE THEREOF

FIELD OF THE INVENTION

The present invention relates to a backlight module, and more particularly to a switchable backlight module and a display device thereof.

BACKGROUND OF THE INVENTION

As privacy awareness rises, display devices are provided with two switchable modes including an anti-peep mode and a sharing mode. Users may switch between the two modes according to use requirements or conditions. The switching between the anti-peep mode and the sharing mode may be implemented via two sets of backlight components including a lower light guide plate and an upper light guide plate. In a current structure, a prism sheet, a diffusion sheet, and a privacy filter are disposed between the lower light guide plate and the upper light guide plate to guide the viewing angle of the light emitted from the lower light guide plate and block the light with a large viewing angle. However, the use of an optical film such as the prism sheet heightens the manufacturing cost and increases the thickness of the backlight module; and moreover, the optical film such as the privacy filter affects light use efficiency, resulting in insufficient brightness and higher power.

SUMMARY OF THE INVENTION

The present invention provides a backlight module, which has a simple structure, and is conductive to reducing the cost, and to solving the problems of energy consumption and insufficient light, and improves the image brightness.

The backlight module provided by the present invention comprises a first light guide plate, a second light guide plate, a turning film, a first light source module, a second light source module, and a third light source module. The first light guide plate has a first light entrance surface, a first light-emitting surface, a first bottom surface, and a light guide structure, wherein the first light-emitting surface and the first bottom surface are located on two opposite sides of the first light guide plate and are connected to the first light entrance surface, respectively; and the light guide structure is formed on the first bottom surface. The second light guide plate is disposed above the first light-emitting surface of the first light guide plate and has a second light-emitting surface, a second bottom surface, a second light entrance surface, a third light entrance surface, and a plurality of optical microstructures, wherein the second bottom surface and the second light-emitting surface are located on two opposite sides of the second light guide plate and are connected to the second light entrance surface, respectively; the second light entrance surface and the third light entrance surface are located on two opposite sides of the second light guide plate and are connected to the second light-emitting surface and the second bottom surface, respectively. The turning film is disposed between the first light guide plate and the second light guide plate; the first light source module is disposed on one side of the first light entrance surface of the first light guide plate; the second light source module is disposed on one side of the second light entrance surface of the second light guide plate; and the third light source module is disposed on one side of the third light entrance surface of the second light guide plate; wherein the first light source module, the second light source module, and the third light source module are further configured to switch the backlight module among a plurality of modes, including: an anti-peep mode and a sharing mode; wherein the first light source module is enabled, so that the backlight module is in the anti-peep mode; the first light source module, the second light source module, and the third light source module are simultaneously enabled, so that the backlight module is in the sharing mode.

In an embodiment of the present invention, the above first light source module comprises a plurality of light-emitting components disposed along a first direction; the light guide structure comprises a plurality of prisms arranged along a second direction, and the second direction is different from the first direction.

In an embodiment of the present invention, the above second direction is perpendicular to the first direction.

In an embodiment of the present invention, the above light guide structure further comprises a plurality of microstructure groups, and each of the plurality of microstructure groups has a plurality of microstructures and disposed between adjacent two of the prisms, respectively.

In an embodiment of the present invention, the above plurality of microstructure groups further comprise a first microstructure group, and the plurality of microstructures of the first microstructure group are disposed along a linear path.

In an embodiment of the present invention, the above plurality of microstructures of the plurality of microstructure groups are arranged in a mutually staggered manner.

In an embodiment of the present invention, the above plurality of optical microstructures comprise a plurality of convex dots formed on the second bottom surface, the second light-emitting surface, or a combination thereof.

In an embodiment of the present invention, the above plurality of optical microstructures comprise a plurality of concave holes formed on the second bottom surface, the second light-emitting surface, or a combination thereof.

In an embodiment of the present invention, the above turning film further has a prismatic surface, and the prismatic surface faces the first light guide plate to have the turning film be disposed between the first light guide plate and the second light guide plate.

The present invention further provides a display device, comprising a display panel and the above backlight module.

In the present invention, the first light guide plate, the second light guide plate, and the turning film are used, wherein the first light guide plate has the light guide structure, and the second light guide plate has the optical microstructures, accordingly, the backlight module has a simplified structure, and is conductive to solve the problems of insufficient light and energy consumption, to prolong the service time, and to improve the image brightness and the usage experience.

DETAILED DESCRIPTION OF PREFERRED EMBODIMENTS

The above and other technical contents, features and effects of the present invention will be clearly presented in the detailed description of a preferred embodiment below in conjunction with the reference drawings. The directional term mentioned in the embodiment below, such as up, down, left, right, front, or back, is only the direction with reference to the accompanying drawings. Therefore, the directional terms used are used to explain rather than to limit the present invention. In addition, the terms "first", "second", and the like mentioned in this specification or the scope of the patent application are only used to name the elements or distinguish different embodiments or scopes, rather than to limit the upper or lower limit of the number of elements.

Figure 1:
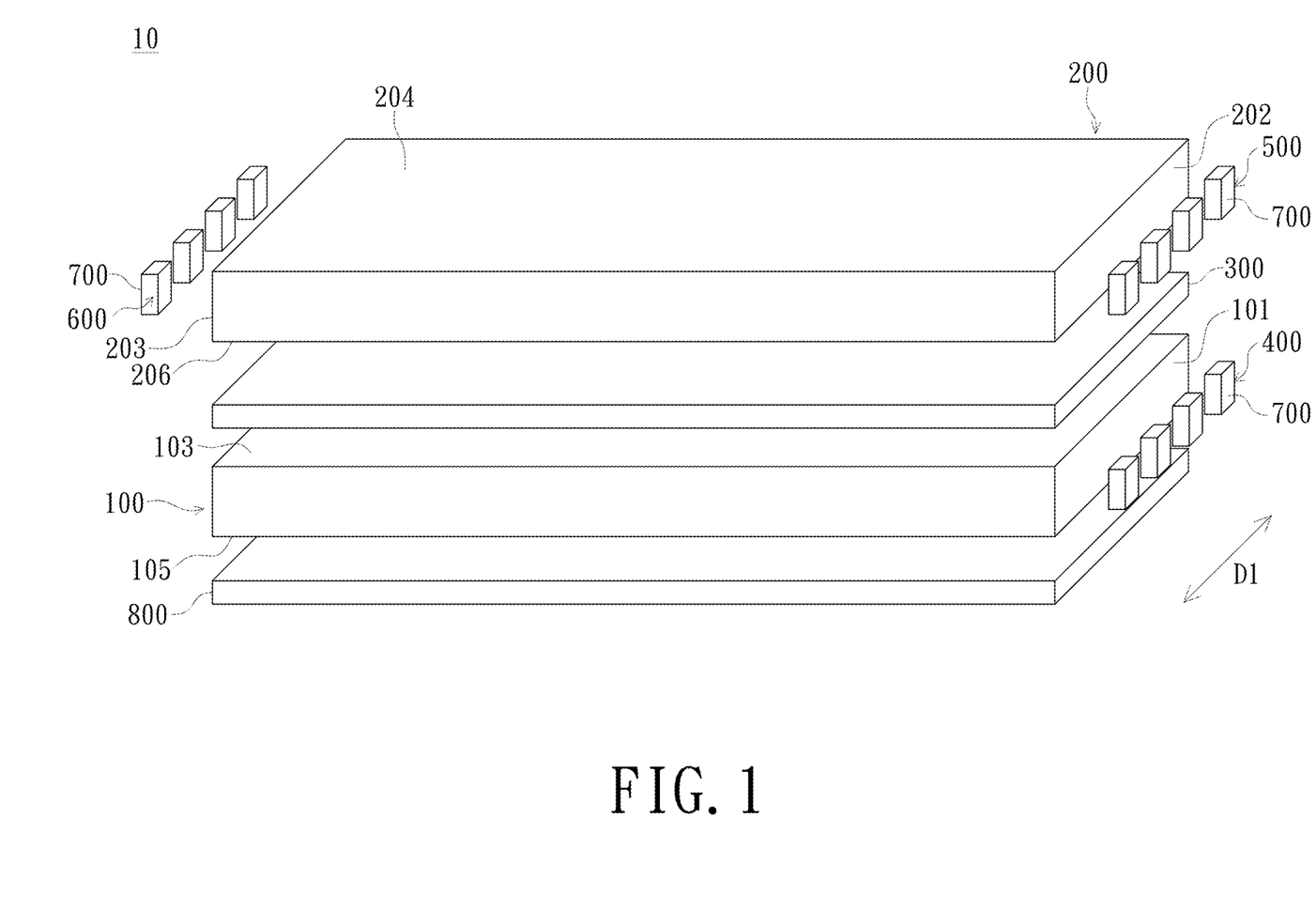
FIG. 1 is a schematic three-dimensional view of a backlight module according to an embodiment of the present invention.

FIG. 1 is a schematic three-dimensional view of a backlight module according to an embodiment of the present invention. As shown in FIG. 1, in the embodiment of the present invention, the backlight module 10 includes a first light guide plate 100, a second light guide plate 200, at least two light source modules, and a turning film 300. The first light guide plate 100 has a first light entrance surface 101, a first light-emitting surface 103, and a first bottom surface 105, wherein the first light-emitting surface 103 and the first bottom surface 105 are located on two opposite sides of the first light guide plate 100 and are connected to the first light entrance surface 101, respectively. The second light guide plate 200 has a second light entrance surface 202, a second light-emitting surface 204, and a second bottom surface 206, wherein the second bottom surface 206 and the second light-emitting surface 204 are located on two opposite sides of the second light guide plate 200 and are connected to the second light entrance surface 202, respectively. The second light guide plate 200 is disposed above the first light guide plate 100, and the second bottom surface 206 faces the first light-emitting surface 103 of the first light guide plate 100. The turning film 300 is disposed between the first light guide plate 100 and the second light guide plate 200, and has a prismatic surface. The prismatic surface faces the first light guide plate 100 to have the turning film 300 be disposed between the first light guide plate 100 and the second light guide plate 200, and the first light-emitting surface 103 of the first light guide plate 100 faces the turning film 300. In addition, the backlight module 10 may further include other optical films to achieve or optimize a required optical quality and the visual effect. For example, in the embodiment of the present invention, the backlight module 10 may include an optical film 800 such as a reflector sheet, which is disposed on the first bottom surface 105 of the first light guide plate 100 and configured to reflect the emitted light back into the first light guide plate 100.

The light source modules are arranged on sides of the light entrance surfaces of the first light guide plate 100 and the second light guide plate 200, wherein the light source modules include a first light source module 400 and a second light source module 500. The first light source module 400 is disposed on the side of the first light entrance surface 101 of the first light guide plate 100, and the light generated by the first light source module 400 may enter the first light guide plate 100 from the first light entrance surface 101. The second light source module 500 is disposed on a side of the second light entrance surface 202 of the second light guide plate 200, and the light generated by the second light source module 500 may enter the second light guide plate 200 from the second light entrance surface 202. In this embodiment, the first light entrance surface 101 and the second light entrance surface 202 are located on the shorter sides of the first light guide plate 100 and the second light guide plate 200, respectively; however, the present invention is not limited to this. In the preferred embodiment, each light source module may include a plurality of light-emitting components 700. The light-emitting components 700 can be, for example, light-emitting diodes. The plurality of light-emitting components 700 of the first light source module 400 can be arranged on the side of the first light entrance surface 101 along a first direction D1. In addition, the second light entrance surface 202 can be substantially parallel to the first light entrance surface 101, and the plurality of light-emitting components 700 of the second light source module 500 can be arranged on the side of the second light entrance surface 202 and substantially along the first direction D1.

In the preferred embodiment of the present invention, the second light guide plate 200 further has another light entrance surface such as a third light entrance surface 203. The third light entrance surface 203 is also connected to the second bottom surface 206 and the second light-emitting surface 204, and preferably, the third light entrance surface 203 and the second light entrance surface 202 are located on two opposite sides of the second light guide plate 200, respectively. In this way, a plurality of light sources can have the light enter the second light guide plate 200 from the two opposite sides. As shown in FIG. 1, the backlight module 10 may further include a third light source module 600, which is disposed on the side of the third light entrance surface 203 of the second light guide plate 200. The light generated by the third light source module 600 can enter the second light guide plate 200 from the third light entrance surface 203.

In the embodiment of the present invention, enabling and disabling of different light source modules can be independent of each other. For example, the first light source module 400 and the second light source module 500 include circuit boards, respectively, for controlling the enabling and disabling of the first light source module 400 and the second light source module 500, respectively, wherein the first light source module 400 can provide a first surface light source in combination with the first light guide plate 100, and the second light source module 500 can provide a second surface light source in combination with the second light guide plate 200. However, the enabling and disabling of different light source modules can alternatively be controlled by a same circuit board. For example, a circuit board of the second light source module 500 can also control the enabling and disabling of the third light source module 600. Therefore, the plurality of light source modules on the sides of the second light guide plate 200 can be simultaneously enabled or disabled independently of the light source module of the first light guide plate 100. Both the first and second surface light sources can be enabled or disabled, or one of them is enabled by means of the enabling and disabling of the plurality of light source modules.

Figure 2:
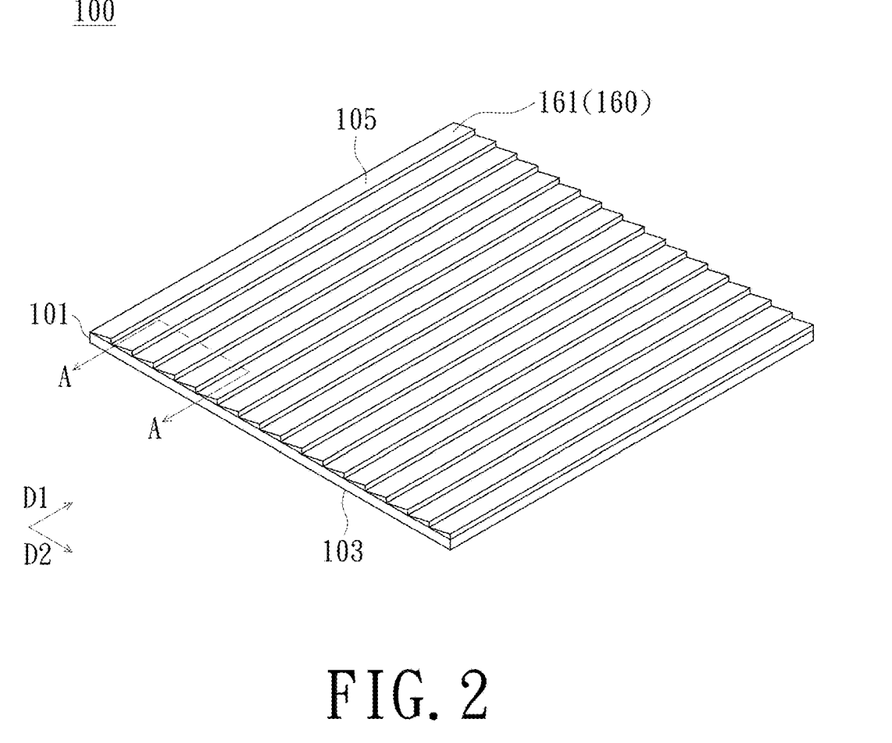
FIG. 2 is a schematic three-dimensional view of a first light guide plate according to an embodiment of the present invention.

The first light guide plate 100 further has a light guide structure 160, which is preferably formed on the first bottom surface 105. The light guide structure 160 can make the light traveling in the first light guide plate 100 be emitted from the first light-emitting surface 103 and then incident on the turning film 300. The light guide structure 160 can have any shape and make the emitted light has a higher directivity. For example, the light guide structure 160 may include, but is not limited to, a plurality of V-shaped trenches. In an embodiment of the present invention, as shown in FIG. 2, the light guide structure 160 can include a plurality of prisms 161. The plurality of prisms 161 are arranged along a second direction D2, and the second direction D2 is different from the first direction D1. The plurality of prisms 161 can control a light-emitting angle of the light emitting from the first light-emitting surface 103. In some embodiments of the present invention, each prism 161 further extends along the first direction D1, and the first direction D1 is perpendicular to the second direction D2. In addition, the prisms 161 may alternatively extend along a nonlinear path.

Figure 3:
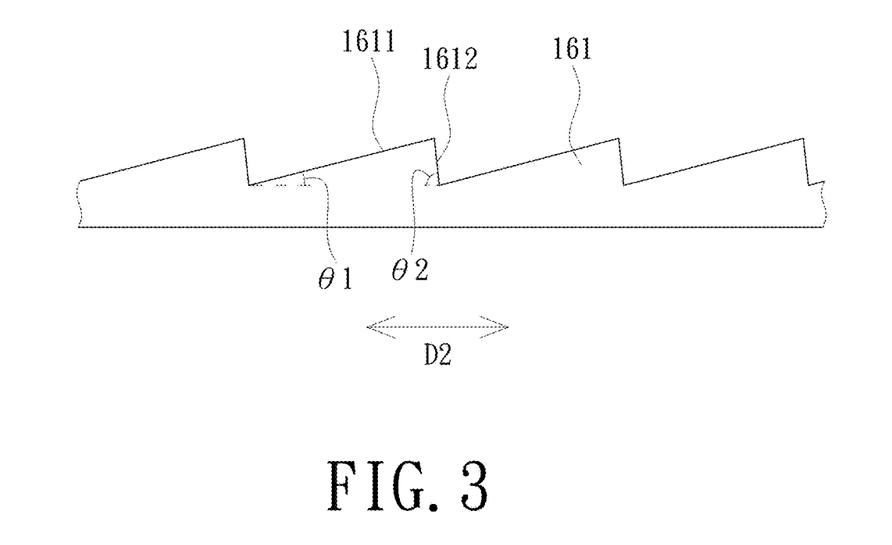
FIG. 3 is a schematic partial sectional view of a first light guide plate according to an embodiment of the present invention.

FIG. 3 shows a schematic sectional view of a section line A-A in FIG. 2. As shown in FIG. 3, each prism 161 can have planes 1611 and 1612. An angle θ1 is formed between the plane 1611 and the first bottom surface 105, an angle θ2 is formed between the plane 1612 and the first bottom surface 105, and the angle θ1 is preferably different from the angle θ2. The angle θ1 and the angle θ2 can be adjusted, to provide an appropriate reflection effect relative to the first light entrance surface 101, and to achieve the higher directivity at an expected light-emitting angle. Sections of the prisms 161 shown in FIG. 3 are triangular in substance, and a distance between the two adjacent prisms is fixed. However, the present invention is not limited to this. In other embodiments, the sections of the prisms 161 can alternatively be in other geometric shapes, and in addition, the distance between the two adjacent prisms 161 can change along with positions. In the embodiment of the present invention, the distance between the two adjacent prisms 161 can range from 0.01 mm to 1 mm.

Figure 4:
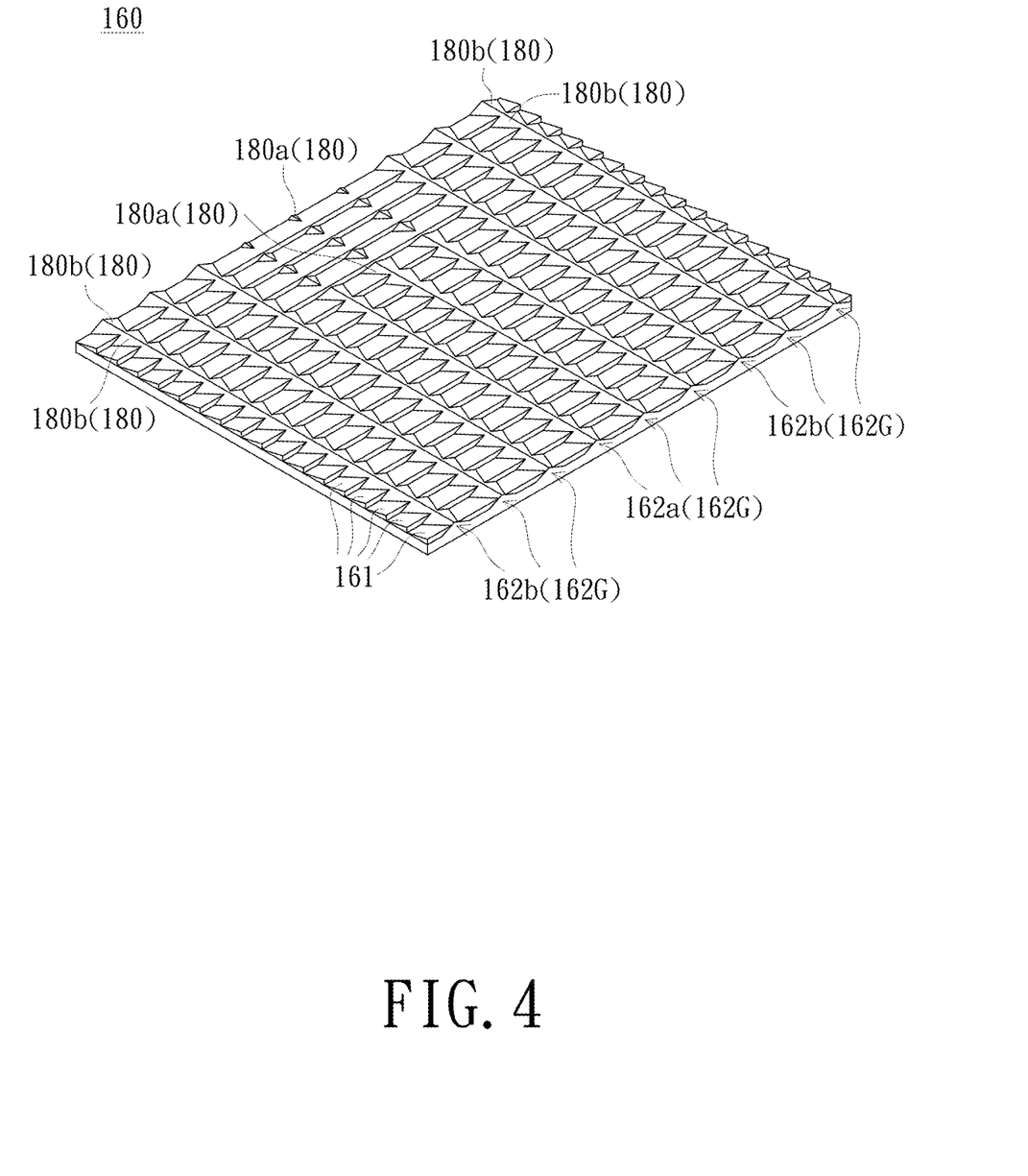
FIG. 4 is a schematic three-dimensional view of a first light guide plate according to another embodiment of the present invention.

In other embodiments of the present invention, as shown in FIG. 4, the light guide structure 160 can further include a plurality of microstructure groups 162G, each of which has a plurality of microstructures 180 disposed between the two adjacent prisms 161. The microstructures 180 can improve the uniformity of the first surface light source and avoid bright or dark lines. The plurality of microstructures 180 in each microstructure group 162G can be non-connected, partially connected, or fully connected to one another, and in addition, the plurality of microstructures 180 in each microstructure group 162G can be arranged along a predetermined path. For example, as shown in FIG. 4, the plurality of microstructure groups 162G further include a first microstructure group 162a and a second microstructure group 162b. A plurality of first microstructures 180a of the first microstructure group 162a are arranged along a linear path and partially connected, and a plurality of second microstructures 180b of the second microstructure group 162b are fully connected. In other embodiments, the plurality of microstructures 180 may alternatively be arranged along, for example, a "Z"-shaped path, so as to present a staggered state.

Figure 5:
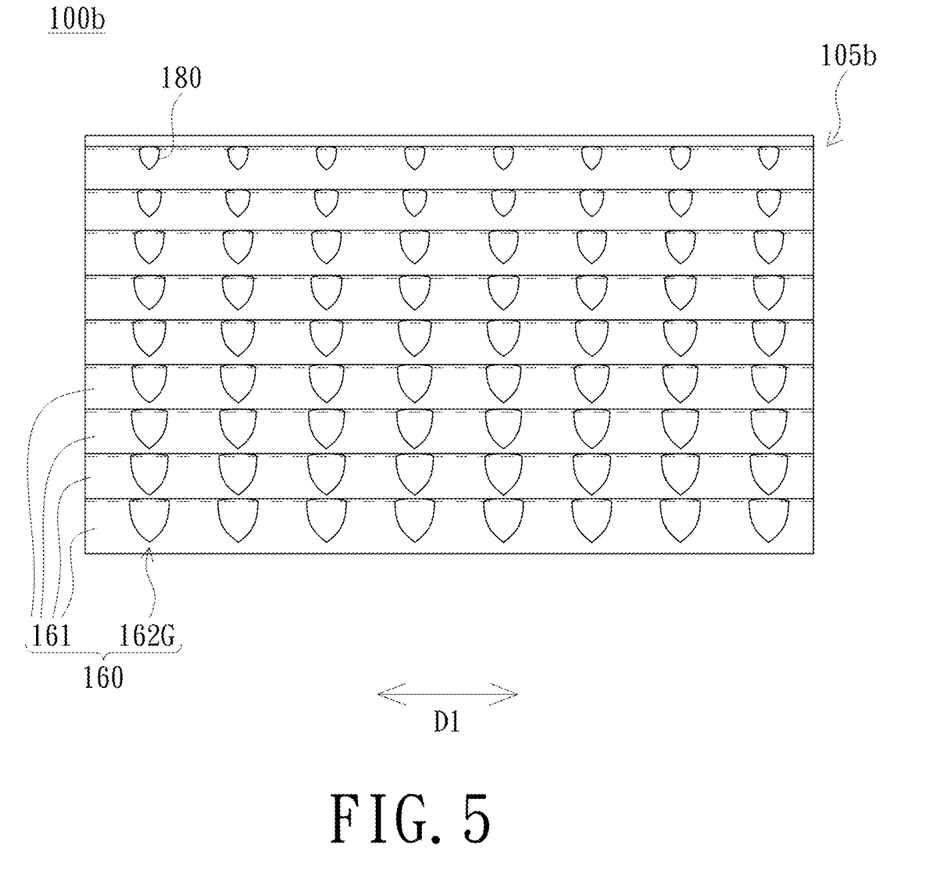
FIG. 5 is a schematic bottom view of a first light guide plate according to another embodiment of the present invention.

The microstructures 180 shown in FIG. 4 are raised bumps. However, in other embodiments, the microstructures 180 may alternatively be recessed grooves. In addition, the plurality of microstructures 180 can present a shape of pyramid, for example, some microstructures 180a present the shape of pyramid and have flat side surfaces. However, in other embodiments, the microstructures 180 may alternatively have curved surfaces. FIG. 5 is a schematic bottom view of a first light guide plate according to another embodiment of the present invention. As shown in FIG. 5, the light guide structure 160 of a first light guide plate 100b includes the plurality of prisms 161 and the plurality of microstructure groups 162G, wherein edge lines of the prisms 161 are marked with solid lines on a first bottom surface 105b, and valley lines of the prisms 161 are marked with dashed lines. A difference between this embodiment and the first light guide plate 100 is that the surfaces of the microstructures 180 are the curved surfaces, and the section shape in the first direction D1 can have a curve.

Based on the light guide structure 160, the light emitted from the first light guide plate 100 has the higher directivity, and the emitted light is incident on the turning film 300 at the expectable angle. Herein, the turning film 300 can adjust the angle of the light. In the preferred embodiment of the present invention, the turning film 300 can guide the angle of the light to be approximately perpendicular to the light-emitting surface. In a word, the first surface light source provided by the first light source module 400 and the first light guide plate 100 has the higher light directivity, and the turning film 300 further concentrates the light in a small viewing angle range near a normal direction of the light-emitting surface, so that the display device (described later) has an anti-peep effect.

The second light guide plate 200 further has a plurality of optical microstructures 270, which are formed on the second bottom surface 206 and/or the second light-emitting surface 204. The plurality of optical microstructures 270 can make the light traveling in the second light guide plate 200 be emitted from the second light-emitting surface 204. The optical microstructures 270 can have any shape, to diverge the light and make the light be emitted at a large viewing angle from the second light-emitting surface 204. In an embodiment of the present invention, the plurality of optical microstructures 270 include a plurality of concave holes or convex dots formed randomly on the second bottom surface 206.

Figure 6:
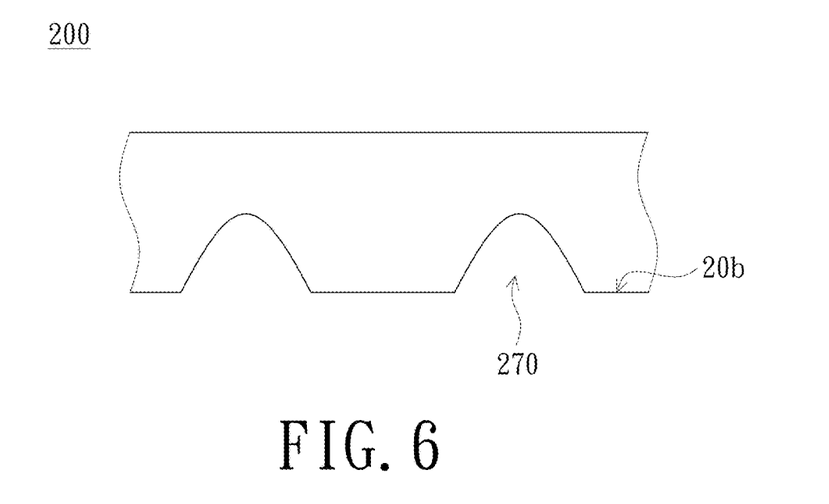
FIG. 6 is a schematic partial sectional view of a second light guide plate according to an embodiment of the present invention.

FIG. 6 is a schematic partial sectional view of a second light guide plate according to an embodiment of the present invention. As shown in FIG. 6, the optical microstructures 270 can be concave holes. Preferably, each concave hole has a curved surface, such as an arc surface, such as an inner surface of a semicircular sphere, and an opening thereof can be substantially circular. In addition, the optical microstructures 270 can alternatively be convex dots. Preferably, each convex dot has a curved surface or an arc surface such as a surface of a semicircular sphere, and a bottom thereof may be circular in substance. In an embodiment of the present invention, a height or depth of each optical microstructure 270 can range from 0.1 μm to 10 μm. In the embodiments where the plurality of optical microstructures 270 are the convex dots, each optical microstructure 270 has a diameter ranging from 20 μm to 30 μm and a height ranging from 0.1

μm to 0.3 μm. For example, each convex dot has a diameter of about 24.5 μm and a height of about 0.18 μm. In the embodiments where the plurality of optical microstructures 270 are the concave holes, each optical microstructure 270 has a diameter ranging from 20 μm to 30 μm and a depth ranging from 4.0 μm to 5.5 μm. For example, each concave hole has a diameter of about 22 μm and a height of about 4.8 μm.

In a word, the second surface light source provided by the second light source module 500, the third light source module 600, and the second light guide plate 200 has a higher light divergence and a larger viewing angle range. Further, in the embodiment of the present invention, the second light source module 500 and the second light guide plate 200 can provide the light with a large viewing angle on a right side (that is, the side of the second light source module 500) in substance, and the third light source module 600 and the second light guide plate 200 may provide the light with a large viewing angle on a left side (that is, the side of the third light source module 600) in substance, so that the display device (described later) can achieve a sharing effect.

Figure 7:
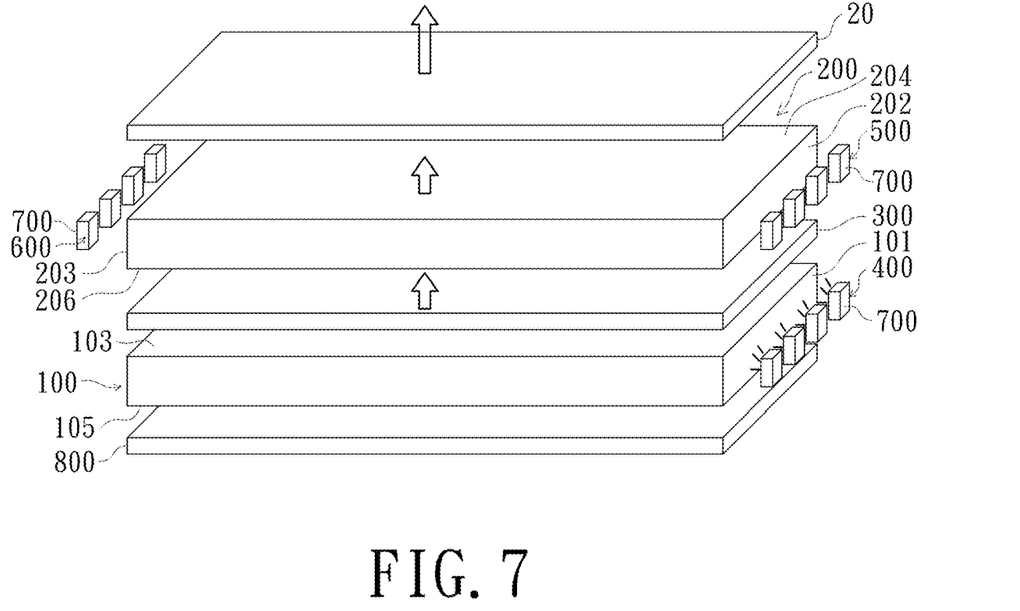
FIG. 7 is a schematic three-dimensional view of a display device according to an embodiment of the present invention.
Figure 8:
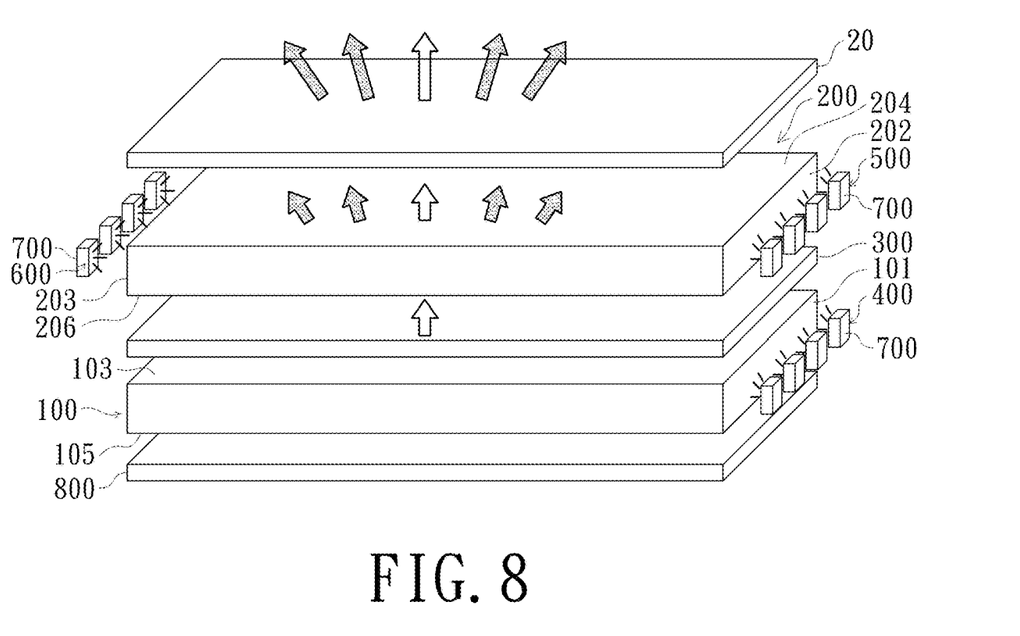
FIG. 8 is another schematic three-dimensional view of a display device according to an embodiment of the present invention.
Figure 9:
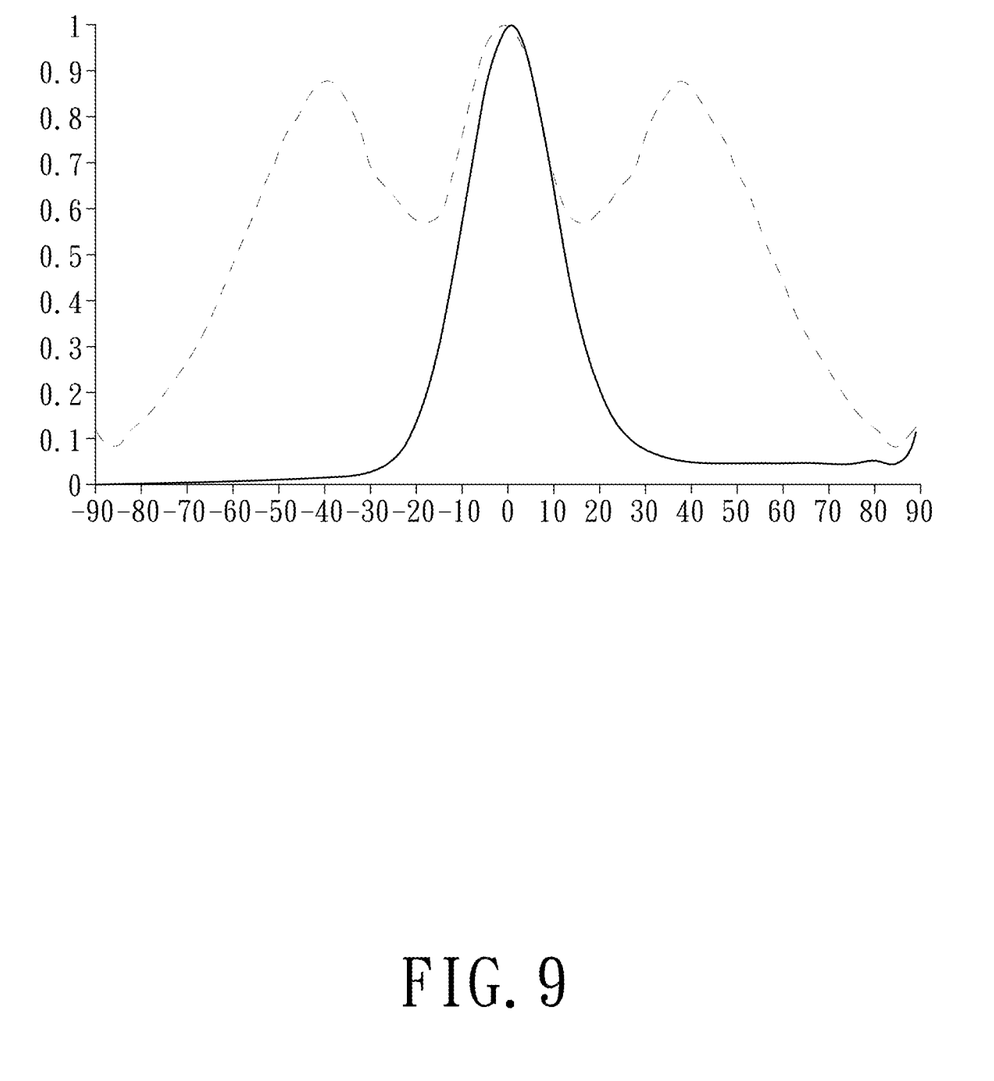
FIG. 9 is a diagram of a relationship between a horizontal viewing angle and a light quantity of a display device according to an embodiment of the present invention.
Figure 10:
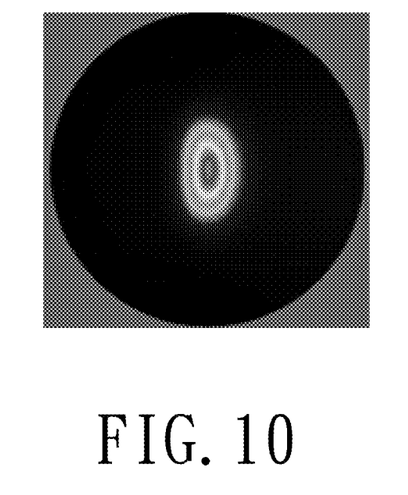
FIG. 10 is a light field distribution diagram of a display device according to an embodiment of the present invention in an anti-peep mode.
Figure 11:
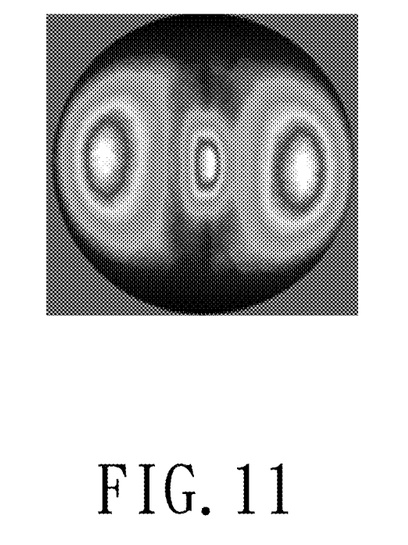
FIG. 11 is a light field distribution diagram of a display device according to an embodiment of the present invention in a sharing mode.

The present invention further provides a display device, which can execute the anti-peep mode or the sharing mode to achieve the anti-peep effect or the sharing effect. FIGS. 7 to 8 are schematic three-dimensional views of a display device according to an embodiment of the present invention in two modes, respectively. As shown in FIGS. 7 to 8, the display device 1 includes a display panel 20 and the above backlight module 10. The display panel 20 can be, for example, a liquid crystal display (LCD) panel, and the display device 1 can be, for example, a laptop, a tablet computer, a mobile phone, or a display mounted on an electronic device. As shown in FIG. 7, when the anti-peep mode is executed, the first light source module 400 is enabled to emit the light. In this case, the light emitted by the first surface light source is guided by the turning film 300 and concentrated in the small viewing angle range near the normal direction of the light-emitting surface. The light reaches the display panel 20 through the second light guide plate 200 to be used for the display panel 20 to implement a narrow-viewing-angle image display. FIG. 9 represents a relationship between a horizontal (left-right) viewing angle and a light quantity of a display device 1 in two modes including the anti-peep mode and the sharing mode, and FIGS. 10 to 11 are light field distribution diagrams of a display device 1 in two modes. As shown in a solid curve in FIG. 9 and FIG. 10, the image light is concentrated in a center and a viewing angle of ±20°. Therefore, the anti-peep mode can prevent people other than users from peeking at image contents from other angles, and ensure the privacy of information. As shown in FIG. 8, when the sharing mode is executed, the first light source module 400, the second light source module 500, and the third light source module 600 emit the light. In this case, in addition to the small viewing angle range near the normal direction, the second surface light source is provided for the display panel to implement a large-viewing-angle image display. As shown in a dashed curve in FIG. 9 and FIG. 10, the image light is distributed in a viewing angle of approximately ±80°. In addition, the diagrams in the anti-peep and sharing modes in FIG. 9 are compared, where a horizontal axis represents the horizontal viewing angle and a vertical axis represents the brightness. As shown in the figure, even if the light is concentrated in the small viewing angle range in the anti-peep mode, the brightness is still good. In addition, in the sharing mode, there is the brightness close to 80% or above of the measured maximum brightness near a viewing angle of 0° and a view angle of ±40°. In this way, the present invention simplifies the use of the optical films, changes the light path, and improves the light use efficiency. First, the structure of the backlight module is simplified; second, the service time is prolonged; and third, the problems of insufficient light and energy consumption in the anti-peep mode are solved, so that the image brightness and the usage experience are improved.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A backlight module, comprising:
   a first light guide plate having a first light entrance surface, a first light-emitting surface, a first bottom surface, and a light guide structure, wherein the first light-emitting surface and the first bottom surface are located on two opposite sides of the first light guide plate and are connected to the first light entrance surface, respectively, and the light guide structure is formed on the first bottom surface and comprises a plurality of prisms;
   a second light guide plate disposed above the first light-emitting surface of the first light guide plate and having a second light-emitting surface, a second bottom surface, a second light entrance surface, a third light entrance surface, and a plurality of optical microstructures, wherein the second bottom surface and the second light-emitting surface are located on two opposite sides of the second light guide plate and are connected to the second light entrance surface, respectively; the second light entrance surface and the third light entrance surface are located on two opposite sides of the second light guide plate and are connected to the second light-emitting surface and the second bottom surface, respectively;
   a turning film, disposed between the first light guide plate and the second light guide plate and having a prismatic surface, and the prismatic surface facing the first light guide plate to have the turning film be disposed between the first light guide plate and the second light guide plate;
   a first light source module, disposed on one side of the first light entrance surface of the first light guide plate and comprising a plurality of light-emitting components disposed along a first direction; wherein the plurality of prisms of the light guide structure are arranged along a second direction different from the first direction;
   a second light source module disposed on one side of the second light entrance surface of the second light guide plate; and
   a third light source module disposed on one side of the third light entrance surface of the second light guide plate;
   wherein the first light source module, the second light source module, and the third light source module are further configured to switch the backlight module among a plurality of modes, including:

an anti-peep mode; wherein the first light source module is enabled, so that the backlight module is in the anti-peep mode; and a sharing mode; wherein the first light source module, the second light source module, and the third light source module are simultaneously enabled, so that the backlight module is in the sharing mode.

2. The backlight module according to claim 1, wherein the second direction is perpendicular to the first direction.

3. The backlight module according to claim 1, wherein the light guide structure further comprises a plurality of microstructure groups, and each of the plurality of microstructure groups has a plurality of microstructures disposed between adjacent two of the prisms, respectively.

4. The backlight module according to claim 3, wherein the plurality of microstructure groups further comprise a first microstructure group, and the plurality of microstructures of the first microstructure group are disposed along a linear path.

5. The backlight module according to claim 3, wherein the plurality of microstructures of the plurality of microstructure groups are arranged in a mutually staggered manner.

6. The backlight module according to claim 1, wherein the plurality of optical microstructures comprise a plurality of convex dots formed on the second bottom surface, the second light-emitting surface, or a combination thereof.

7. The backlight module according to claim 1, wherein the plurality of optical microstructures comprise a plurality of concave holes formed on the second bottom surface, the second light-emitting surface, or a combination thereof.

8. A display device, comprising:
a backlight module, comprising:
a first light guide plate having a first light entrance surface, a first light-emitting surface, a first bottom surface, and a plurality of light guide structures, wherein the first light-emitting surface and the first bottom surface are located on two opposite sides of the first light guide plate and are connected to the first light entrance surface, respectively, and the light guide structures are formed on the first bottom surface and comprise a plurality of prisms;
a second light guide plate disposed above the first light-emitting surface of the first light guide plate and having a second light-emitting surface, a second bottom surface, a second light entrance surface, a third light entrance surface, and a plurality of optical microstructures, wherein the second bottom surface and the second light-emitting surface are located on two opposite sides of the second light guide plate and are connected to the second light entrance surface, respectively; the second light entrance surface and the third light entrance surface are located on two opposite sides of the second light guide plate and are connected to the second light-emitting surface and the second bottom surface, respectively;

a turning film, disposed between the first light guide plate and the second light guide plate and having a prismatic surface, and the prismatic surface facing the first light guide plate to have the turning film be disposed between the first light guide plate and the second light guide plate;

a first light source module, disposed on one side of the first light entrance surface of the first light guide plate and comprising a plurality of light-emitting components disposed along a first direction; wherein the plurality of prisms of the light guide structures are arranged along a second direction different from the first direction;

a second light source module disposed on one side of the second light entrance surface of the second light guide plate; and a third light source module disposed on one side of the third light entrance surface of the second light guide plate; and a display panel disposed on the backlight module and facing the second light-emitting surface of the second light guide plate.

9. The display device according to claim 8, wherein an anti-peep mode and a sharing mode are provided, and the display device is capable of being switched between the anti-peep mode and the sharing mode, wherein:

when the display device is in the anti-peep mode, the first light source module emits light, and the light emitted by the first light source module reaches the display panel via the first light guide plate, the turning film, and the second light guide plate; and when the display device is in the sharing mode, the first light source module emits the light, and the light emitted by the first light source module reaches the display panel via the first light guide plate, the turning film, and the second light guide plate; and the second light source module and the third light source module emit light, and the light emitted by the second light source module and the light emitted by the third light source module reach the display panel via the second light guide plate.

* * * * *